A. PERRY.
TROLLEY WHEEL.
APPLICATION FILED JULY 8, 1909.

1,087,396.

Patented Feb. 17, 1914.

WITNESSES
Chas. Sonntag.
F. C. Fliedner.

INVENTOR
Amos Perry,
BY
Lincoln Sonntag
ATTORNEY

UNITED STATES PATENT OFFICE.

AMOS PERRY, OF SAN FRANCISCO, CALIFORNIA.

TROLLEY-WHEEL.

1,087,396.  Specification of Letters Patent.  Patented Feb. 17, 1914.

Application filed July 8, 1909. Serial No. 506,528.

*To all whom it may concern:*

Be it known that I, AMOS PERRY, a citizen of the United States, residing at San Francisco, in the county of San Francisco and State of California, have invented certain new and useful Improvements in Trolley-Wheels, of which the following is a specification.

My invention relates to improvements in trolley-wheels.

The object of my invention is to provide a trolley-wheel having certain features whereby a steady, uniform and prolonged lubrication of the same in the running thereof will be obtained thereby prolonging the life thereof, as well as obviating the necessity of frequent attention to the same.

My invention consists in the novel construction and combination of parts shown in the accompanying drawing, described in the following specification and claimed in the appended claim.

Figure 1:
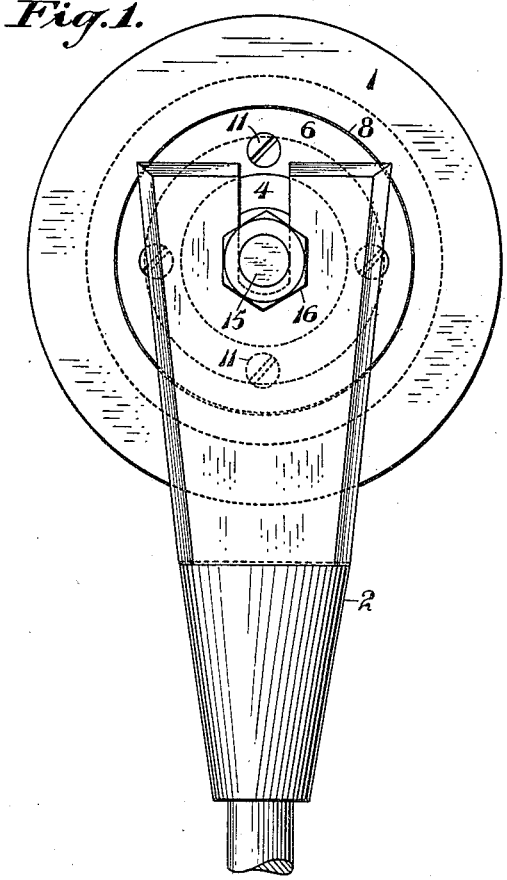
Figure 2:
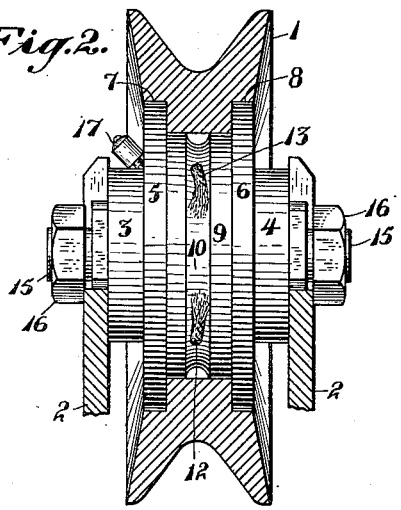
Figure 3:
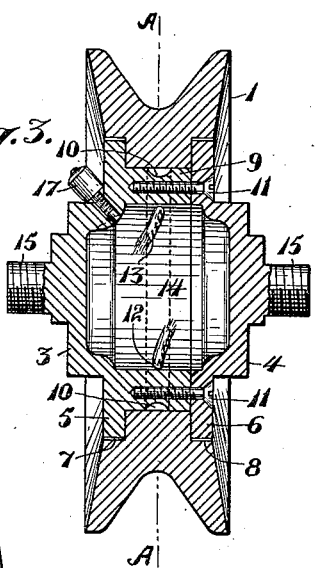
Figure 4:
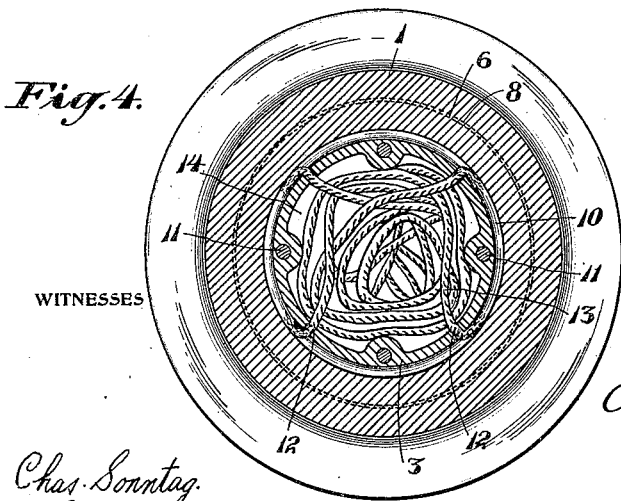

In the drawing Figure 1 is a side view of my trolley wheel attached to the trolley-harp, the same being partly shown in dotted lines. Fig. 2 is an edge view of the said wheel showing the movable grooved rim hereinafter mentioned in section. Fig. 3 is also an edge view of said wheel showing said rim and the axle in section. Fig. 4 is a section of said trolley-wheel on line A—A of Fig. 3.

In the figures 1 is the annularly grooved rim of the trolley wheel turnably mounted on a hub composed of two parts 3 and 4. The said hub is secured to a trolley-harp 2, and said parts of the axle have flanges 5 and 6 which fit into the recesses 7 and 8 in said rim 1. 9 indicates the bearing surface of the part 3 of said axle and has an annular groove 10 for each of the wicks or absorbent material 13 to rest in, the said wicks passing through the holes 12 and feeding oil from the oil chamber 14 to the bearing surface 9 for said grooved rim. The two parts of the axle are secured together by screws 11. The parts marked 15 indicate threaded lugs for nuts 16 for securing the trolley wheel to the trolley harp, 2.

17 represents an oil cup or valve to supply oil to the oil chamber 14.

The groove in the rim 1 as shown in Fig. 2 and Fig. 3 is the preferred form thereof for contact with the trolley-wire in all conditions of its use. The flanges or bearings 5 and 6 are substantially identical in size and construction, except that the flange integral with part 4 contains apertures for screws to secure said flange to part 3. In practice the oil chamber should be filled with oil, whereby through the wicks a steady feeding of oil for the purpose of lubrication is accomplished.

Having thus described my invention what I claim as new and desire to secure by Letters Patent, is:—

In combination with a trolley harp, a trolley wheel having an axle and having a central oil chamber, the wall of said chamber having inwardly extending projections and consisting of two parts, one of said parts having an inwardly projecting tubular portion depressed below said flange, and provided with a central annular groove having a plurality of equidistant holes extending through the wall of said projecting portion to said groove, and the other of said parts having also an annular flange in engagement with and removably secured to said projecting tubular portion, a rim for said wheel having inner side recesses movably engaging said flanges and said tubular portion so depressed, hubs for said wheel extending outwardly from said flanges, lugs projecting from said hubs seated in said trolley harp, and an oil cup extending angularly through one of said hubs to said oil chamber.

In testimony whereof I affix my signature, in presence of two witnesses.

AMOS PERRY.

Witnesses:
L. SONNTAG,
A. K. DAGGETT.

Copies of this patent may be obtained for five cents each, by addressing the "Commissioner of Patents, Washington, D. C."